A. L. & O. H. ELIEL.
APPARATUS FOR ELEVATING GOLD BEARING DEPOSITS FROM RIVER BEDS.
APPLICATION FILED FEB. 19, 1908.
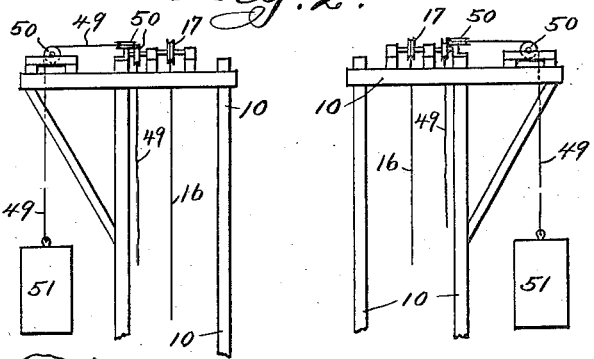
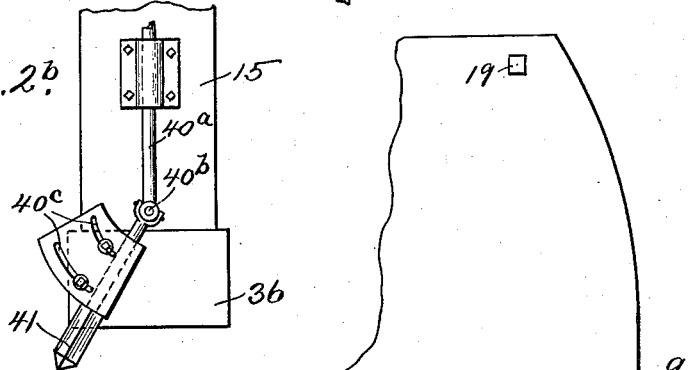
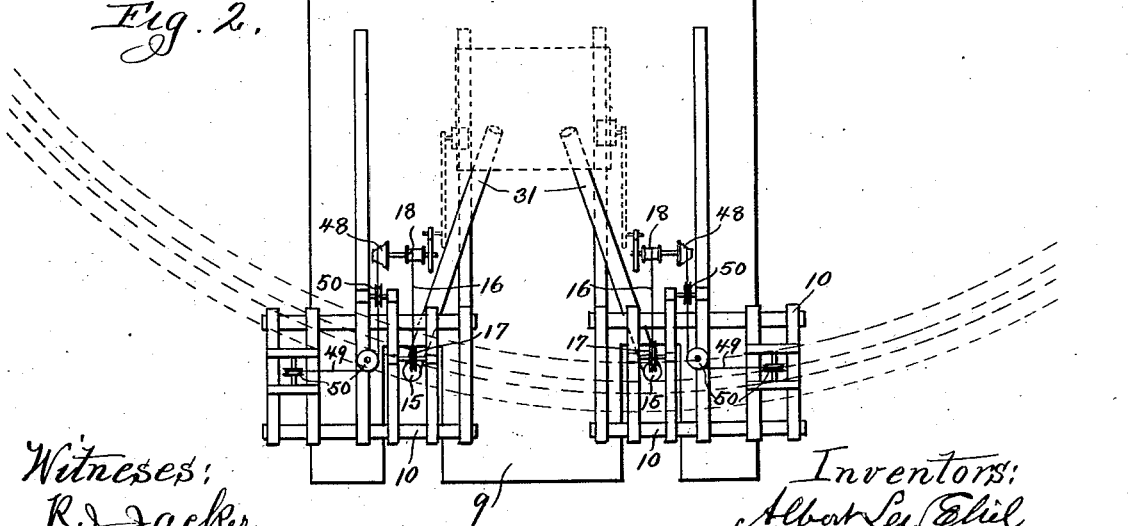

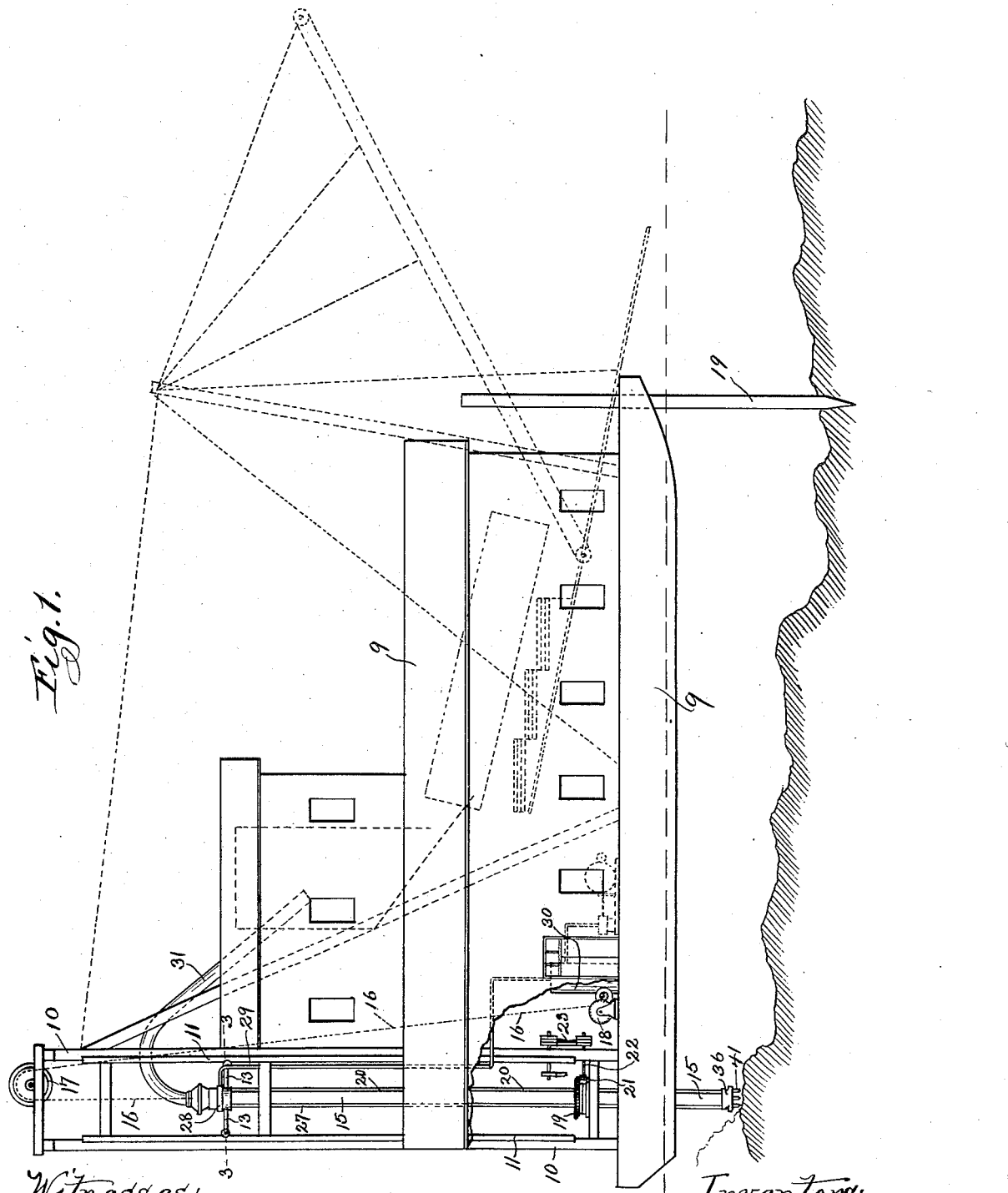

A. L. & O. H. ELIEL.
APPARATUS FOR ELEVATING GOLD BEARING DEPOSITS FROM RIVER BEDS.
APPLICATION FILED FEB. 19, 1908.
910,277.
Patented Jan. 19, 1909.
4 SHEETS—SHEET 3.
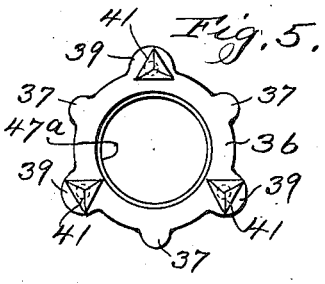
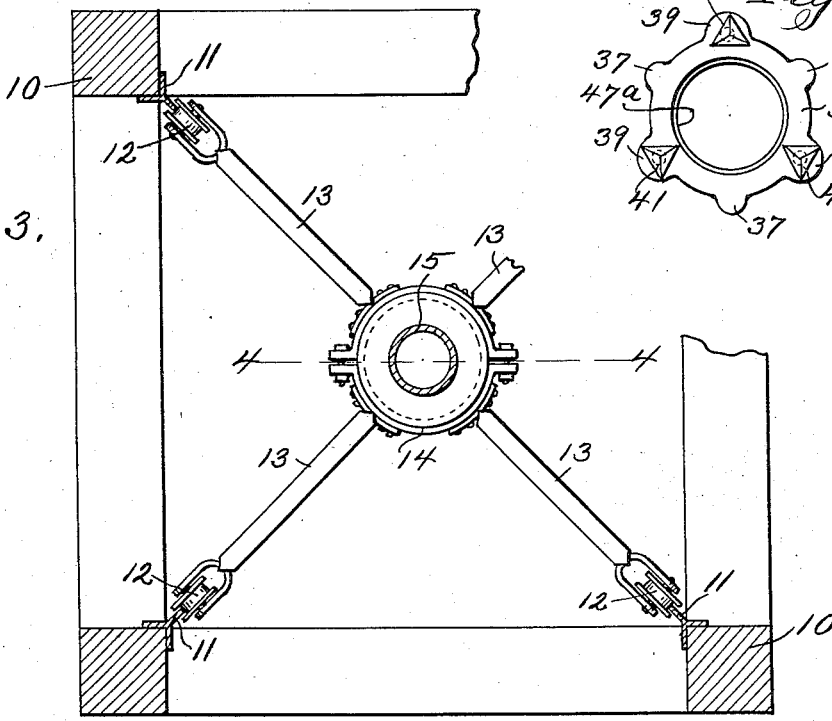
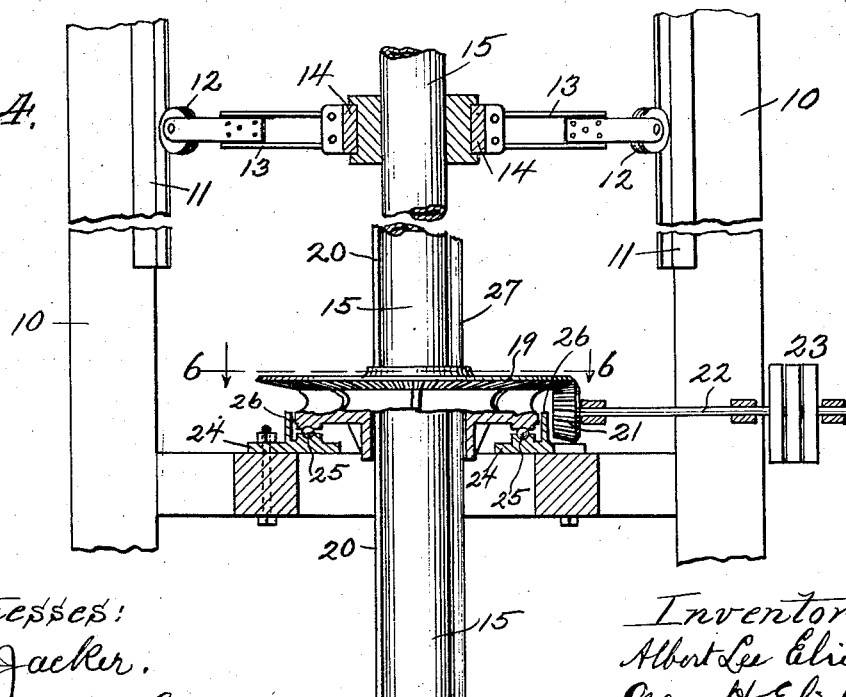

A. L. & O. H. ELIEL.
APPARATUS FOR ELEVATING GOLD BEARING DEPOSITS FROM RIVER BEDS.
APPLICATION FILED FEB. 19, 1908.
910,277.
Patented Jan. 19, 1909.
4 SHEETS—SHEET 4.
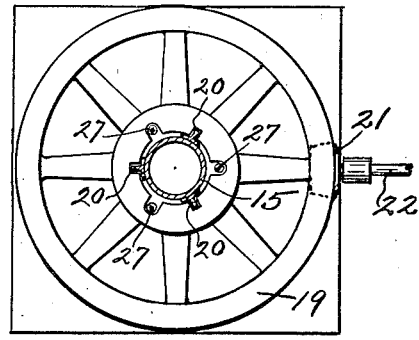
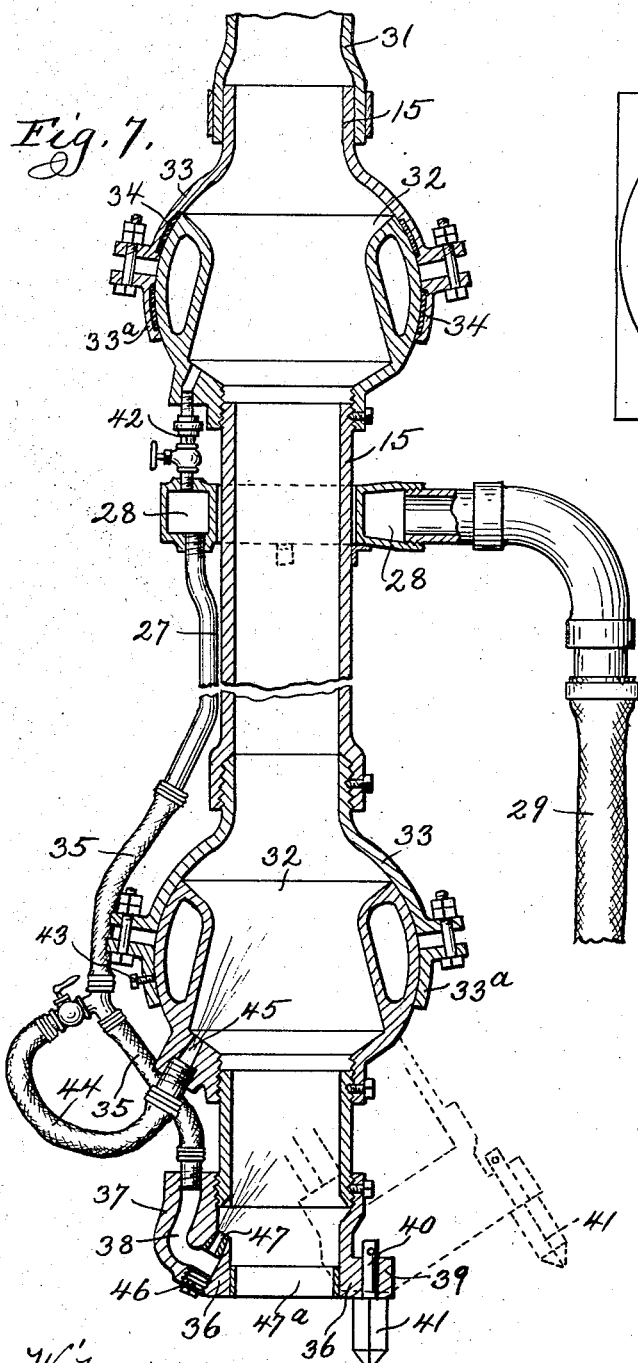
Witnesses:
R. J. Jacker.
Milton Lenox
Inventors:
Albert Lu Eliel
Oscar H. Eliel
By Jno. H. Whipple
Atty.

UNITED STATES PATENT OFFICE.

ALBERT LEE ELIEL, OF SAN FRANCISCO, CALIFORNIA, AND OSCAR H. ELIEL, OF LA SALLE, ILLINOIS, ASSIGNORS OF ONE-THIRD TO LEWIS E. AUBURY, OF SAN FRANCISCO, CALIFORNIA.

APPARATUS FOR ELEVATING GOLD-BEARING DEPOSITS FROM RIVER-BEDS.

No. 910,277.      Specification of Letters Patent.      Patented Jan. 19, 1909.

Application filed February 19, 1908. Serial No. 416,804.

*To all whom it may concern:*

Be it known that we, ALBERT LEE ELIEL, a citizen of the United States of America, and a resident of San Francisco, in the county of San Francisco and State of California, and OSCAR H. ELIEL, of La Salle, in the county of Lasalle and State of Illinois, have invented certain new and useful Improvements in Apparatus for Elevating Gold-Bearing Deposits from River-Beds, of which the following is a specification.

Our invention relates to means for stirring up platinum, gold or other metal-bearing sediments or petroleum, gravel, sand, silt, mud, and the like, in river beds and elevating the same with a percentage of water through a partially submerged open-ended hollow shaft by compressed air introduced into such hollow shaft at or near its lower end; and the objects of the improvements are: first, to provide a suitable device for carrying or handling one or more partially submerged hollow shafts and air tubes in conjunction therewith and moving them vertically and laterally in relation to the water bed or bottom; second, to provide means for varying the angle of the submerged hollow shafts relatively to the water bed or dredge boat, in order to reach pockets or uneven places where rough bed rock bottom is found; third, to provide devices in conjunction with the open end of the hollow shafts for stirring up or agitating the deposits on the water bed around and in close proximity to the hollow shafts, say from four to five inches from the open end of the hollow shafts and just below the same; and fourth, to provide improvements in details for bettering the general working of the apparatus as will be made to appear further on.

We attain these objects by the mechanism illustrated in the accompanying drawings, in which—

Figure 1 (Sheet 1) is a side elevation of a dredge boat showing the apparatus, in elevation, mounted thereon. Fig. 2 (Sheet 2) is a plan view of the same. Fig. 2ª is a detail showing a fragmentary front elevation of the upper part of the frame with its shafts and pulleys. Fig. 2ᵇ is a detail showing a modification. Fig. 3 (Sheet 3) is a detail showing in fragment an enlarged horizontal section at the line 3 3 of Fig. 1. Fig. 4 is a detail showing an enlarged vertical section in fragment taken on the line 4 4 of Fig. 3 at the axis of the hollow shafts with parts in elevation. Fig. 5 is a detail showing a plan view of the bottom at the end of the submerged hollow shaft in connection with a foot-piece on which is mounted a stirring device. Fig. 6 (Sheet 4) is an enlarged horizontal section at the line 6 6 of Fig. 4. Fig. 7 is a detail showing a fragmentary sectional view including a modification of the stirring device at the lower end. Fig. 8 is a fragmentary view showing another modification of the stirring device, and of the means for operating it.

Similar signs marked on the drawings refer to similar parts throughout the several views.

The means shown for accomplishing the first of the above named objects consists of a dredge boat 9 of any suitable capacity on which is mounted one or more gallows-frames 10, the vertical uprights of which are provided with guides 11 upon which travel rollers 12 of arms 13, connected with a casting 14 made in halves which are adapted to fit into a groove in a hub or ring fixed to the hollow shaft 15 at its upper end when the halves are bolted together around the ring so that the arms are supported on or fixed to the hollow shaft vertically in a manner adapted to permit the hollow shaft to revolve independent of the arms, the function of the arms being to support the upper end of the hollow shaft 15 centrally within the gallows-frame and allow it to have vertical and rotary movement therein. The hollow shaft 15 and arms 13 are supported within the frame and moved vertically therein by means of a cable 16 (shown in dotted lines Fig. 1) attached to the upper end of the hollow shaft and passing thence up and over a sheave 17 and down to a windlass 18. The hollow shaft is given oscillatory, rotary movement by means of a grooved bevel wheel 19 and feathers 20 of the hollow shaft, as seen in Fig. 4, which can slide vertically through the grooves of the wheel, but will cause the hollow shaft to rotate with the wheel. The feathers run nearly the entire length of the hollow shaft. The pinion 21 for operating the wheel 19 engages the under side of said wheel, and its shaft 22 is connected with pulley and belt mechanism as seen at 23 (Fig. 1) having a straight and a cross belt and three pulleys (two outer ones tight and a middle one loose) on a shaft in connection with an ordinary automatic device (not shown) for alternately throwing the straight and the cross belt for producing oscillatory, rotary movement of the hollow shaft 15 through an arc of from a quarter to a third of a circle. The wheel 19 rests upon a cast iron base plate 24 provided on top with an annular groove 25 in which are placed steel balls which in turn fit into a corresponding groove in the under side of the wheel's arms.

The base plate has an annular flange 26 projecting upward from its top surface, and the outer ends of the arms of wheel 19 are arranged to fit down within such flange. The base plate is bolted to horizontal pieces of the gallows-frame at its base so that said flange of the base plate, operating in conjunction with the arms of said wheel will prevent the lateral displacement of said wheel on the base plate. The base plate has a large opening at the center sufficient to allow the hollow shaft and the stirring device to be raised through the same and strike the underside of the wheel in case of being unintentionally lifted too high which would lift the wheel off of the base plate and the pinion 21, thus preventing breakage. The wheel by reason of its connection with the base plate affords a free working guide for the hollow shaft to slide up and down through at the base of the gallows-frame. We prefer to use a hollow shaft of about 10 inch bore made of steel and heavy enough to stand great strain.

Metallic air tubes 27 are preferably mounted at their ends on the outside of the hollow shafts and extended parallel therewith and at a slight distance therefrom from the top to the bottom end passing loosely through openings in lugs of the wheel 19 as seen in Fig. 6. We prefer to use three of the air tubes and arrange them equidistant apart around the hollow shaft. The upper ends of the air tubes are connected with an air box 28 placed around the hollow shaft 15 (Fig. 7) and a flexible hose 29 connects the air box with a reservoir 30 of compressed air or gas from which the air box and air tubes receive their supply. The air tubes are curved upwardly at their lower ends, pass through the wall of the hollow shaft and terminate in nozzles which point upward and toward the axis of the hollow shaft a short distance above the open end of the hollow shaft, the three jets of air therefrom producing a conic lifting force at the center of the bore and applied within the open end thereof at the bottom. This forms a well balanced air current towards the outlet end of the discharge hose 31 attached at the top of the hollow shaft and gives a much more effectual result than if the air was distributed in any other number of pipes.

The means for attaining the second of the above named objects consists in providing the hollow shaft at one or more points at the top and below the gallows-frame with a ball joint, which will permit turning or flexure of said hollow shaft and the discharge hose at its connection therewith without interfering with the partial rotation thereof and in providing flexible hose couplings for the air tubes around such ball joints. The ball joint is shown in Fig. 7 and comprises a globular shell 32 threaded or otherwise secured upon the end of one section of the tube 15 and a globular shell socket made in two parts 33, 33$^a$ and adapted to be bolted together upon the globular shell 32, one of said parts being threaded upon the opposite section of hollow shaft 15. The members of the ball joint may be babbitted as seen at 34. The air tubes 27 are made in sections between ball joints which are joined with flexible hose couplings 35 which permit flexure of the air tubes at the ball joints.

The means for attaining the third object above mentioned consists in one or more plows or agitators mounted on the lower end of the hollow shaft and adapted to be operated thereby. The function of the plow is to stir up the gravel or sand at the mouth of the hollow shaft and in close proximity to the water flow into the same. The plows may be varied in form or shape as may be deemed best suited to the material to be worked, sharp plows for gravel, etc., flat-ended plows for bed rock. We prefer flat pointed to sharp pointed plows to give a scraping effect, and a strong steel brush may be employed so as to cover thoroughly the bed rock and crevices in same and brush the same in proximity to the end of the hollow shaft.

The bottom end of the hollow shaft is provided with a foot-piece, section or ring 36 which is threaded or otherwise secured to the hollow shaft. This ring is provided with projections 37 having up-turned openings 38 with which the air tubes 27 communicate as seen in Figs. 7 and 8 and also other projections 39 provided with smooth straight openings in which the shank 40 of the plows or stirrers 41 are secured by a linch pin so as to turn freely. In the present instance the stirrers are shown as having a triangular body with a bevel pointed lower end, being best suited to travel over rock bottom without great wear or injury. When the hollow shaft is lowered until the lower end strikes the sediment at the river bed and the bow of the dredge boat is moved back and forth, or from side to side, and the hollow shaft rotated as indicated, the sediment is stirred by the plows around and below the open end of the hollow shaft and the mass of roiled sediment with its particles of precious metal is raised into the mouth of the hollow shaft or they flow toward the same, so that the air currents are applied under the mass in the hollow shaft and are thus enabled to lift and carry the same up through the hollow shaft and out through the discharge hose.

The simple introduction of the three air pipes into up-turned openings in the plow section, as closely to the bottom edge as practicable is an important feature, and in consequence gives the highest practical efficiency.

In the modification shown in Fig. 8 the plow shank 40 is connected with a shaft 40ª which may be extended up and connected with suitable mechanism on the dredge boat for rotating said shaft and the plow independent of the rotation of the hollow shaft.

It is preferred in some cases to have individually-adjustable foot-pieces for the stirring devices so mounted as to be set at an inclination to the hollow shaft and at a slight angle to the shaft, 40ª and in connection with the shaft 40ª. For this purpose the shaft 40ª has a universal joint 40ᵇ at its lower end and in connection with the upper end of the shank 40. The foot-pieces are individually mounted on the lower end of this hollow shaft and secured thereto by bolts working in arc slots 40ᶜ formed in the body of the foot-piece on radii of the universal joint in such manner as to adjust the angle of said shank with said shaft without breaking the operative connection between said parts (see Fig. 2ᵇ).

Among the details involving other improvements may be mentioned the secondary air feed which is located directly below the ball joint at the upper end of the hollow shaft and consists in three, valved air tubes 42 having connection with the air box 28 and terminating in nozzles within the globular shell of the said ball joint. This serves the purpose of a booster and need only be used in case of deep dredging where material is to be lifted exceptionally high or delivered at considerable distance. The valved air tubes 42 are preferably placed equidistant apart but not connected with the air box at points directly opposite to the air tubes 27.

Another detail noted is the ball joint placed just above the plow section, as shown in Fig. 7, and provided with a set screw 43 (one or more) whereby a short section of the hollow shaft 15 just above the plow section can be turned and set at a slight inclination to the line of the main part of said hollow shaft as illustrated by dotted lines, for the purpose of more advantageously working pockets or depressions in rough rock bottom. In such case the sand and rock would enter at an angle and have a tendency to strike the side of the ball joint wall. This is avoided by providing an air jet through a flexible branch air tube 44 provided with a valve so air can be shut off when not required, which is so directed as to pass between the incoming mass and said wall to operate as a cushion jet 45 to change its direction to correspond with the direction of the line of the main portion of said hollow shaft.

A further detail is in the provision for exchanging nozzles of the air tubes whereby a larger one may be substituted for a smaller one, or the reverse, which consists in providing a plug opening 46 (Fig. 7) in line with the nozzle opening at the inner end of the upturned opening 38 which is made tapering at this point and adapted to serve as a socket for separate nozzle-pieces of different size of bore, the plug 46 being removed, a nozzle piece 47 of any desired size may be inserted or removed and replaced by another.

The extreme lower end of the hollow shaft is provided with a detachable steel ring 47ª slightly contracting the mouth of the hollow shaft and serving the purpose of a wearing piece and sizer.

To the windlass shaft is keyed a spirally grooved cone 48, to which is attached a cable 49 playing upon idlers 50 and carrying a weight 51, which operates as a common fusee to vary the leverage and automatically counterbalance the hollow shaft in proportion to the amount of its submergence, and equalizing the pressure on the plows.

It is intended the term "vertically-arranged" as herein applied to the hollow, open-ended shaft, means and includes any angle or upward inclination at which compressed air admitted into the bore of the shaft at its lower end when submerged will cause the mass of material flowing in to be lifted through the bore and flow out at the upper end, for the purpose mentioned.

Having described our invention, what we claim is:—

1. An open-ended, vertically-arranged, hollow shaft and a frame in which the said hollow shaft is mounted so as to slide vertically, in combination with mechanism for moving said hollow shaft vertically and horizontally and imparting to it reciprocating rotary movement and an air tube connected with the bottom end for introducing compressed air into said hollow shaft when partially submerged.

2. An open-ended, vertically-arranged hollow shaft and a frame in which said hollow shaft is mounted so as to slide and to rotate, in combination with mechanism for moving said hollow shaft vertically, mechanism for imparting to said hollow shaft reciprocating rotary movement, and an air tube connected with the bottom end for introducing compressed air into the hollow shaft when partially submerged.

3. An open-ended, vertically-arranged, hollow shaft and a frame in which said hollow shaft is mounted so as to slide vertically in combination with mechanism for moving said hollow shaft vertically and horizontally, an air tube connected with the bottom of said hollow shaft and means for automatically counter balancing the hollow shaft in proportion to the amount of its submergence.

4. An open-ended, vertically-arranged, hollow shaft, an air box mounted on the hollow shaft at the upper end, air tubes communicating with the air-box and with the lower end of the hollow shaft and a flexible tube communicating with the air-box and with a source of compressed air.

5. An open-ended, vertically-arranged, hollow shaft and a frame in which said hollow shaft is mounted so as to slide vertically, an air-box mounted on said hollow shaft near its upper end, air tubes comunicating with the air-box and with the hollow shaft at its lower end, a flexible tube communicating with the air-box, and a source of compressed air, in combination with means for reciprocating the hollow shaft vertically.

6. An open-ended, vertically-arranged, hollow shaft and a frame in which said hollow shaft is mounted so as to slide vertically, an air-box mounted on said tube near its upper end, air tubes communicating with the air-box and with the hollow shaft at its lower end, a flexible tube communicating with the air-box and a source of compressed air, in combination with means for reciprocating the hollow shaft vertically and horizontally.

7. An open-ended, vertically-arranged, hollow shaft and a frame in which said hollow shaft is mounted so as to slide vertically, an air-box mounted on said hollow shaft near its upper end, air tubes communicating with the air-box and with the hollow shaft at its lower end, a flexible tube communicating with the air-box and a source of compressed air, in combination with means for reciprocating the hollow shaft vertically and horizontally and imparting to it reciprocating rotary movement.

8. An open-ended, vertically-arranged, hollow shaft provided with an air-box at its upper end, air tubes communicating with the air-box and with the lower end of the hollow shaft, and valved air tubes communicating with the air-box and with the hollow shaft above the air-box.

9. An open-ended, vertically-arranged, hollow shaft and a frame in which it is mounted so as to slide vertically in combination with means for moving the same vertically and horizontally and imparting to it reciprocating rotary movement, air tubes communicating with the lower end of said hollow shaft and with a source of compressed air, and a stirring device mounted on said hollow shaft and projecting below its lower end.

10. An open-ended, vertically-arranged, hollow shaft provided with a longitudinal feather and slidably mounted in a frame in combination with a centrally perforated grooved wheel loosely mounted on the frame, the hollow shaft passing loosely through the perforation of the wheel with its feather in the groove, and means for imparting reciprocating rotary motion to the wheel.

11. An open-ended, vertically-arranged, hollow shaft provided with a longitudinal feather and slidably mounted in a frame in combination with a centrally perforated grooved gear wheel and automatic reversing mechanism for imparting reciprocating, rotary movement to said wheel.

12. An open-ended, vertically-arranged, hollow shaft, slidably and rotatably mounted in a frame and having stirring and scraping devices mounted on its lower end.

13. An open-ended, vertically-arranged, hollow shaft slidably and rotatably mounted in a frame and having stirring devices detachably mounted on its lower end.

14. An open-ended, vertically-arranged, hollow shaft slidably and rotatably mounted in a frame and provided at its lower end with an annular foot-piece having openings terminating in nozzles entering the bore of the hollow shaft just above its lower end.

15. An open-ended, vertically-arranged, hollow shaft slidably and rotatably mounted in a frame and provided with an annular foot-piece and stirring devices loosely mounted on said foot-piece.

16. An open-ended, vertically-arranged, hollow shaft slidably and rotatably mounted in a frame and provided at its lower end with an annular foot-piece having three equidistant openings for air inlets directed toward the axis of said foot-piece and inclined upwardly.

17. An open-ended, vertically-arranged, hollow shaft slidably and rotatably mounted in a frame and provided with an annular foot-piece provided with nozzles arranged around the foot-piece equdistant apart for air jets directed toward the axial center and at about 28° from the vertical.

18. An open-ended, vertically-arranged, hollow shaft slidably and rotatably mounted in a frame and provided with an annular foot-piece provided with nozzle socket openings and plug openings with removable plugs at points opposite to the socket openings.

19. An open-ended, vertically-arranged, hollow shaft slidably and rotatably mounted in a frame and provided with a thin steel ring detachably placed within the open end at the bottom, slightly contracting the opening at the extreme end and serving as a sizer and wearing piece.

20. An open-ended, vertically-arranged, hollow shaft slidably and rotatably mounted in a frame and provided with three air pipes arranged around its circumference, and entering its lower open end through three nozzles entering its bore at points equidistant apart and arranged in lines convergent toward and meeting at the axial center of the hollow shaft bore just above the open end giving a full volume of compressed air upon instantaneous expansion of uniform pressure.

21. An open-ended, vertically-arranged, hollow shaft slidably and rotatably mounted in a frame and provided with stirring devices at its lower end and means for vertically moving the same in combination with a fusee adapted to equalize the weight of the hollow shaft proportionally to its submergence.

22. An open-ended, vertically-arranged, hollow shaft slidably and rotatably mounted in a frame and provided with an annular foot-piece having stirring devices, a gear wheel loosely mounted on said hollow shaft to slide thereon, and a base plate for supporting said wheel in relation to the hollow shaft having a central opening sufficient to allow the foot-piece to pass through it.

23. An open-ended, vertically-arranged, hollow shaft slidably and rotatably mounted in a frame and provided with a ball-joint just above the bottom end, in combination with an annular foot-piece at the end and below the ball-joint, and having nozzle openings for admitting compressed air, lock-bolts for setting the ball-joint to hold the foot-piece inclined to the line of the hollow shaft, and air tubes mounted on the hollow shaft above the ball-joint and provided with valved flexible couplings over the ball-joint and communicating with the nozzle openings.

24. An open-ended, vertically-arranged, hollow shaft slidably and rotatably mounted in a frame and provided near its lower end with a ball-joint, primary air tubes communicating with the hollow shaft at its lower end, and flexible air tubes entering through openings in the lower member of the ball-joint and serving as a cushion for the mass of material passing the angle at the ball-joint.

25. An open-ended, vertically-arranged, hollow shaft slidably and rotatably mounted in a frame and provided near its lower end with a set of primary air tubes and a set of secondary air tubes each having upwardly-turned ends with nozzles in combination with an adjustable foot-piece and stirring appliances mounted thereon and means for setting the foot-piece at an angle to the hollow shaft.

26. An open-ended, vertically-arranged, hollow shaft slidably and rotatably mounted in a frame and provided at its lower end with individually-adjustable foot-pieces and stirring devices mounted thereon.

27. An open-ended, vertically-arranged, hollow shaft slidably and rotatably mounted in a frame and provided at its lower end with an adjustable foot-piece, a stirring device rotatably mounted thereon and means independent of the hollow shaft for rotating the stirring device.

ALBERT LEE ELIEL.
OSCAR H. ELIEL.

Witnesses to signature of Albert Lee Eliel:
H. A. MARTIN,
N. A. GERNON.

Witnesses to signature of Oscar H. Eliel:
GEO. A. WILSON, JR.,
F. WORM.